(12) United States Patent
Wada et al.

(10) Patent No.: US 7,019,063 B2
(45) Date of Patent: Mar. 28, 2006

(54) RUBBER COMPOSITION FOR INNER LINER

(75) Inventors: Ichiro Wada, Saitama (JP); Masashi Ohara, Saitama (JP); Osamu Uchino, Tokyo (JP); Toshiaki Koura, Tokyo (JP); Naofumi Ezawa, Tokyo (JP); Motoaki Kanoh, Tokyo (JP); Yasuyoshi Kawaguchi, Tokyo (JP); Shun Nakamura, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 377 days.

(21) Appl. No.: 09/959,418

(22) PCT Filed: Feb. 28, 2001

(86) PCT No.: PCT/JP01/01513

§ 371 (c)(1),
(2), (4) Date: Jan. 15, 2002

(87) PCT Pub. No.: WO01/62846

PCT Pub. Date: Aug. 30, 2001

(65) Prior Publication Data

US 2002/0151636 A1 Oct. 17, 2002

(30) Foreign Application Priority Data

| Feb. 28, 2000 | (JP) | ................................ 2000-051853 |
| Feb. 29, 2000 | (JP) | ................................ 2000-053743 |
| Feb. 29, 2000 | (JP) | ................................ 2000-054877 |
| Aug. 31, 2000 | (JP) | ................................ 2000-263343 |
| Sep. 13, 2000 | (JP) | ................................ 2000-278101 |

(51) Int. Cl.
- C08K 3/34 (2006.01)
- C08K 3/04 (2006.01)
- C08J 3/20 (2006.01)
- B60C 5/01 (2006.01)
- C08L 27/24 (2006.01)

(52) U.S. Cl. .................. 524/445; 524/495; 524/519; 523/351; 152/458; 152/512

(58) Field of Classification Search ................ 524/445, 524/495, 519; 523/351; 152/458, 512

See application file for complete search history.

(56) References Cited

U.S. PATENT DOCUMENTS

| 4,396,051 | A |   | 8/1983 | Ogawa et al. |
| 4,871,004 | A | * | 10/1989 | Brown et al. ............ 152/209.4 |
| 5,333,662 | A |   | 8/1994 | Costemalle et al. |
| 5,871,846 | A | * | 2/1999 | Freeman et al. ............ 428/405 |
| 5,985,970 | A | * | 11/1999 | Chodha et al. ............ 524/269 |
| 6,019,832 | A | * | 2/2000 | Kawazura et al. .......... 106/472 |
| 6,046,266 | A | * | 4/2000 | Sandstrom et al. ......... 524/492 |

FOREIGN PATENT DOCUMENTS

| EP | 0 586 727 A1 | 3/1994 |
| EP | 0 763 563 A1 | 3/1997 |
| JP | 04-080247 | 3/1992 |
| JP | 09-316256 | 12/1997 |
| JP | 10-086604 | 4/1998 |
| JP | 10-086604 A | 4/1998 |

* cited by examiner

*Primary Examiner*—Tae H. Yoon
(74) *Attorney, Agent, or Firm*—Sughrue Mion, PLLC (57) ABSTRACT

The rubber composition of the present invention is used for producing an inner liner of a pneumatic tire, and is obtained by compounding a rubber component and a layered or plate-like mineral. The layered or plate-like mineral has an aspect ratio of 3 or more and less than 30. The present invention further provides a production method of the rubber composition and a pneumatic tire which is produced by using the rubber composition. The present invention is applicable to a tire of passenger vehicles, bus or truck, and a tire of airplane. According to the present invention, the air permeation resistance is remarkably improved and the workability is also improved. Therefore, the rapture and hole defect of a non-vulcanized sheet during the tire construction can be avoided. By using the rubber composition, the gauge of the inner liner of pneumatic tire can be reduced while maintaining the inner pressure of tire, thereby reducing the weight of tire.

11 Claims, 2 Drawing Sheets

RUBBER COMPOSITION FOR INNER LINER

TECHNICAL FIELD

The present invention relates to a rubber composition for inner liner of a pneumatic tire. More specifically, the present invention relates to a rubber composition which provides an inner liner having an excellent air permeation resistance and an improved workability because of its specific compounding formulation containing a butyl rubber, a halogenated butyl rubber or a diene rubber, and to a pneumatic tire having its weight reduced by using the rubber composition.

BACKGROUND ART

To prevent air leakage and maintain the air pressure of a tire constant, an inner liner made of a less air-permeability rubber such as butyl rubber and a halogenated butyl rubber is generally provided on the inner wall of a pneumatic tire. However, since the strength of a non-vulcanized rubber is reduced with increasing content of butyl rubber, a non-vulcanized rubber sheet is susceptible to rapture and hole defect. Particularly, when an inner liner is of smaller gauge, a cord provided inside of the tire easily comes out of the inner liner during the tire construction.

An airplane tire is sometimes exposed to an atmosphere as low as −65° C. Also, a heavy weight vehicle such as truck and bus is occasionally parked in extremely cold region, thereby exposing its tire to a low temperature as low as −50° C. Therefore, if the inner liner of a tire of a heavy weight vehicle is composed mainly of butyl rubber or a halogenated butyl rubber, each having a high glass transition temperature, cracking is liable to occur in the inner liner.

To meet the recent social demand for saving energy, various methods have been proposed in reducing the gauge of inner liner to reduce the weight of a tire. For example, Japanese Patent Application Laid-Open Nos. 7-40702 and 7-81306 propose to use a nylon film layer or a poly (vinylidene chloride) layer in place of butyl rubber. Japanese Patent Application Laid-Open No. 10-26407 proposes to use a film of a composition comprising a thermoplastic resin such as polyamide resins and polyester resins blended with an elastomer.

The proposed methods using the above films are, in some degree, successful in reducing the weight of tire. However, since the matrix of each film is a crystalline resin, the crack resistance and the flexural fatigue resistance are poor, particularly, when used at temperatures lower than 5° C., as compared with a layer generally used, which is made of a composition compounded with butyl rubber. In addition, the use of a matrix crystalline resin makes the process for producing a tire complicated.

Also known are a method of compounding flat mica as a filler for a rubber composition (Japanese Patent Application Laid-Open No. 11-140234) and a method of compounding a clay (Japanese Patent Application Laid-Open No. 5-017641). In these methods, however, the filler is not uniformly dispersed during a rubber kneading when the filling amount is increased, thereby likely to reduce the flexural fatigue resistance and the low-temperature durability because of insufficient dispersion.

DISCLOSURE OF INVENTION

In view of the above state of prior art, an object of the present invention is to provide a rubber composition for inner liner which is excellent in the air permeation resistance and improved in the workability before vulcanization. Another object of the present invention is to provide a pneumatic tire which has an inner liner with its gauge being made extremely thinner by the use of the rubber composition while maintaining the ability of retaining the inner tire pressure, and shows a good crack resistance (low-temperature durability) and a flexural fatigue resistance during the use under low-temperature conditions.

As a result of extensive study for developing a rubber composition having the above superior properties, the inventors have found that the above objects are achieved by using a specific rubber composition compounded with a layered or plate-like mineral. The present invention has been accomplished on the basis of this finding.

Thus, the present invention provides a rubber composition for inner liner of pneumatic tire, which comprises a rubber component and a layered or plate-like mineral compounded with the rubber component, the layered or plate-like mineral having an aspect ratio of 3 or more and less than 30.

In the rubber composition, the rubber component preferably comprises 40 to 100% by weight of at least one rubber selected from the group consisting of butyl rubber and a halogenated butyl rubber and 60% by weight or less of a diene rubber, and a weight-basis compounding amount A of the layered or plate-like mineral per 100 parts by weight of the rubber component preferably satisfies the following Formula I:

$$1 < A \times D < 200 \qquad (I)$$

wherein D represents a thickness (mm) of an inner liner rubber layer.

The present invention further provides a rubber composition for inner liner which is applied to an airplane tire or a tire for heavy weight vehicles used in an extremely low temperature region, in which the rubber component preferably comprises 60 to 100% by weight of a diene rubber.

The present invention still further provides a pneumatic tire having an inner liner made of the above rubber composition.

BEST MODE FOR CARRYING OUT THE INVENTION

In the rubber composition for inner liner of the present invention, a layered or plate-like mineral having an aspect ratio of 3 or more and less than 30 is compounded with a rubber component.

As the rubber component of the rubber composition of the present invention, either of a butyl-based rubber or a diene rubber may be used. The butyl-base rubber preferably contains a halogenated butyl rubber such as chlorinated butyl rubbers, brominated butyl rubbers and modified products thereof. For example, "Enjay Butyl HT10-66" (trade mark, manufactured by Enjay Chemical Co., Inc.) is available for the chlorinated butyl rubber, and "Bromobutyl 2255" (trade mark, manufactured by Exxon Company) is available for the brominated butyl rubber. As the modified rubber, usable is a chlorinated or brominated product of a copolymer of isomonoolefin and p-methylstyrene, which is available as "Expro 50" (trade mark, manufactured by Exxon). The diene rubber to be blended with such a halogenated butyl rubber is, for example, natural rubber, synthetic isoprene rubber (IR), poly(cis-1,4-butadiene) (BR), syndiotactic poly(1,2-butadiene) (1,2BR), styrene-butadiene rubber (SBR), acrylonitrile-butadiene rubber (NBR) or chloroprene rubber (CR). These diene rubbers may be used alone or in combination of two or more.

In view of the air permeation resistance, the rubber component preferably comprises 40 to 100% by weight of the butyl-based rubber and 60% by weight or less of the diene rubber. The rubber composition comprising such a rubber component is suitable for a tire of motorcycle, passenger vehicle, truck, and bus.

For use as a plane tire or a tire of truck or bus, which is used under extremely low temperature conditions, a rubber component comprising 60% by weight or more of the diene rubber is preferred, and a rubber component comprising mainly a natural rubber is more preferred.

Figure 1:
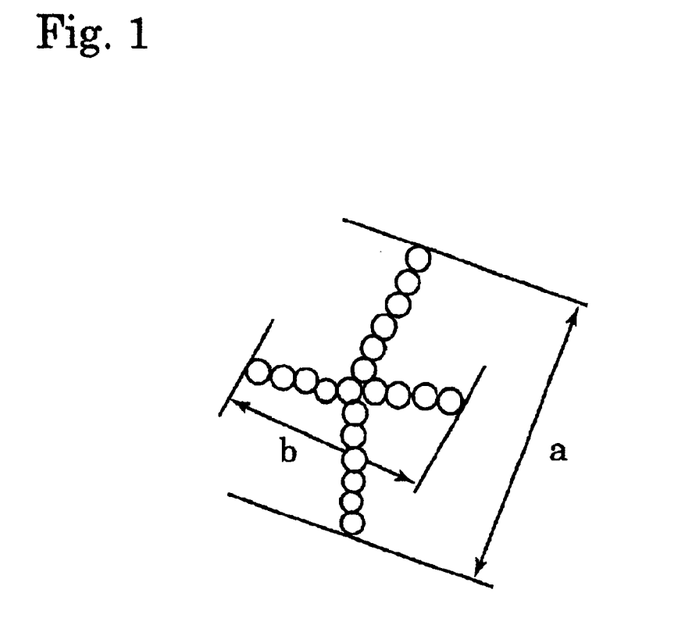
FIG. 1 is a schematic illustration for explaining the aspect ratio.

The layered or plate-like mineral used in the present invention may be either natural mineral or synthetic mineral, and not specifically limited as long as the aspect ratio thereof is 3 or more and less than 30. Examples thereof include kaolin, clay, mica, feldspar, hydrated silica-alumina composite, with a kaolinic clay and mica being preferred and the kaolinic clay being more preferred. The particle size of the layered or plate-like mineral is preferably 0.2 to 2 μm, and the aspect ratio is preferably 5 or more and less than 30, more preferably 8 to 20. When the aspect ratio is 3 or more, a sufficient improvement in the air permeation resistance is obtained. By limiting the aspect ratio to less than 30, the workability can be prevented from being deteriorated. In the present invention, the aspect ratio means a ratio of a/b, wherein a is an average major diameter and b is an average minor diameter of 50 mineral particles arbitrarily selected, determined by microscopic observation. In FIG. 1, the major diameter and the minor diameter of a unit particle are schematically illustrated.

The weight-basis compounding amount A of the layered or plate-like mineral per 100 parts by weight of the rubber component preferably satisfies the following Formula I:

$$1 < A \times D < 200 \qquad (I)$$

wherein D represents a thickness (mm) of an inner liner rubber layer. By regulating the compounding amount within the above range, an excellent improvement in the air permeation resistance is obtained.

The compounding amount of the layered or plate-like mineral is preferably 10 to 200 parts by weight, more preferably 20 to 160 parts by weight based on 100 parts by weight of the rubber component. And the amount of carbon black to be used in the rubber composition is 0 to 60 parts by weight, preferably 0 to 40 parts by weight, and more preferably 5 to 35 parts by weight based on 100 parts by weight of the rubber component.

The total amount of the layered or plate-like mineral and the carbon black is preferably 50 parts by weight or more. In particular, in considering the air permeation resistance, flexural fatigue resistance and workability, the total amount is preferably 60 to 220 parts by weight.

The type of the carbon black is not specifically limited and may be suitably selected from those conventionally used as the reinforcing filler of rubber compositions, such as FEF, SRF, HAF, ISAF and SAF. Of these carbon blacks, preferred are those having a specific surface area determined by nitrogen adsorption ($N_2SA$) of 26 $m^2/g$ to 170 $m^2/g$ when measured according to ASTM D3037-88. The carbon black is preferred to have an iodine adsorption (IA) of 40 mg/g or less when measured according to ASTM D 1510-95 and a dibutyl phthalate adsorption of 100 ml/100 g or less when measured by ASTM D2414-97.

As an example of a preferred rubber composition, mention may be made of a rubber composition for use in inner liner comprises 100 parts by weight of the rubber component comprising at least one butyl-based rubber selected from butyl rubber and a halogenated rubber, 10 to 50 parts by weight of clay, and 10 to 60 parts by weight of the carbon black, with the total of clay and the carbon black being 50 parts by weight or more.

The rubber composition of the present invention may be further compounded with a softening agent such as a naphtene based oil, a paraffin based oil, an aromatic oil and a blown asphalt oil. The compounding amount is not specifically limited and suitably selected depending on the applications. For example, when the total amount of the carbon black and the layered or plate-like mineral is relatively small (up to about 100 parts by weight per 100 parts by weight of the rubber component), the softening agent may be compounded one part by weight or more, preferably 3 to 20 parts by weight per 100 parts by weight of the rubber component. The % $C_N$ of the naphtene base oil is 30 or more, and the % $C_P$ of the paraffin base oil is 60 or more when determined by a ring analysis (n-d-M method).

To enhance the dispersibility of the layered or plate-like mineral throughout the rubber composition, a dispersion improver such as silane coupling agents, dimethylstearylamine and trimethanolamine may be added, if desired, in an amount of 0.1 to 5 parts by weight per 100 parts by weight of the rubber component.

Further, the rubber composition of the present invention may be compounded with organic short fibers made of an organic polymer resin. By compounding organic short fibers, the underlying cords are effectively prevented from being bared to the surface of an inner liner during the construction of tire having an inner liner with a small thickness. The organic short fiber is preferred to have an average diameter of 1 to 100 μm and an average length of about 0.1 to 0.5 mm. The organic short fiber may be compounded as a composite prepared by kneading the organic short fiber and a non-vulcanized rubber component (hereinafter referred to as "FRR").

The compounding amount of the organic short fiber is preferably 0.3 to 15 parts by weight per 100 parts by weight of the rubber component. By compounding 0.3 part by weight or more, the exposure of the underlying cords to the surface of an inner liner is effectively prevented. By limiting the compounding amount to 5 parts by weight or less, the workability is not adversely affected. The materials of the organic short fiber may include, but not specifically limited thereto, a polyamide such as nylon 6 and nylon 66, a syndiotactic poly(1,2-butadiene), an isotactic polypropylene and polyethylene with the polyamide being preferred.

When the organic short fiber is compounded, an rubber-to-fiber adhesion improver such as hexamethylenetetramine and resorcinol may be further compounded to increase the modulus of a resultant rubber composition.

In addition to the above compounding ingredients, the rubber composition of the present invention may be further compounded with another additive used in the rubber art such as vulcanization agents, vulcanization accelerators, antioxidants, scorch retarders, zinc white and stearic acid in an amount not adversely affect the effect of the present invention.

The rubber composition of the present invention may be produced by a known method, namely, by kneading in a kneader the rubber component, the layered or plate-like mineral, and the optional filler or compounding ingredient.

When the layered or plate-like mineral and a filler such as carbon black are compounded in a larger amount in total, for example, exceeding 100 parts by weight in total, it is preferred to first knead the rubber component, the layered or plate-like mineral, a filler such as carbon black and another compounding ingredient except for the vulcanization agent sufficiently at a high temperature, and then to further knead at a low temperature after adding the vulcanization agent. The kneading at a high temperature may be carried out at two or more stages, if desired.

When the layered or plate-like mineral and a filler such as carbon black are compounded in a smaller amount in total, for example, 100 parts by weight or less in total, the electric power to be consumed can be reduced to enhance the productivity by employing a step (a) for pre-kneading the rubber component. In the subsequent kneading step (b) for kneading the pre-kneaded rubber component, the layered or plate-like mineral and the other compounding ingredients, it is preferred to add all the compounding ingredients simultaneously and then carry out the kneading by single stage, because the productivity can be further enhanced.

In the pre-kneading step (a), only the rubber component is masticated in a kneader such as Burberry mixer. The mastication is preferably carried out for 10 sec or more in the present invention. By masticating for 10 sec or more, a possible agglomeration of the layered or plate-like mineral on the surface of a rotor can be prevented in the subsequent kneading step, thereby ensuring a good air permeation resistance and flexural fatigue resistance of the resultant vulcanized rubber composition. Since a long mastication is likely to reduce the productivity, it is more preferred to carry out the mastication for 10 to 60 sec. If the kneading is carried out by single stage while omitting the pre-kneading step, the layered or plate-like inorganic filler is likely to agglomerate on the surface of the rotor, thereby failing to, in some case, obtain a sufficient air permeation resistance and flexural fatigue resistance of the resultant vulcanized rubber composition.

In the kneading step (b), the masticated rubber component is kneaded with the layered or plate-like inorganic filler, carbon black and the other compounding ingredients. If this kneading step is carried out by single stage, the kneading time is preferred to be from one to four minutes. When the kneading time is less than one minute, the filler is likely to be dispersed insufficiently. When the kneading is carried out over four minute, the vulcanization begins partially during the kneading to cause the reduction of the air permeation resistances and flexural fatigue resistance of the resultant vulcanized rubber composition.

When the kneading step is carried out by single stage, it is preferred to control the temperature of the rubber composition at the end of the kneading to 130° C. or lower. If exceeding 130° C., the rubber composition is likely to be vulcanized during the kneading, thereby the air permeation resistance and flexural fatigue resistance of the resultant vulcanized rubber composition are deteriorated.

Since the fillers are well dispersed by following the above production method of the present invention, a rubber composition excellent in air permeation resistance, flexural fatigue resistance and low-temperature durability can be produced with good productivity.

The type of the kneading machine is not specifically limited, and may be suitably selected from those employed in the rubber art, such as, a closed mixer such as Banbury mixer and intermix, and a roll mixer, with the closed mixer being preferred.

The rubber composition of the present invention prepared by the above method is suitably used as an inner liner rubber composition for tires. The rubber composition after vulcanization has a dynamic elastic modulus of preferably 800 MPa or less, more preferably 600 MPa at −20° C. under a strain amplitude of 0.1% or less.

The pneumatic tire of the present invention is produced by a known method while forming the inner liner by the above rubber composition. Namely, the rubber composition of the present invention optionally compounded with the additive mentioned above is extruded, shaped and worked into an inner liner member before subjected to vulcanization. By forming an inner liner from the rubber composition of the present invention, the thickness of the inner liner can be reduced, thereby making it easy to produce a tire having an inner liner of a small gauge.

Figure 2:
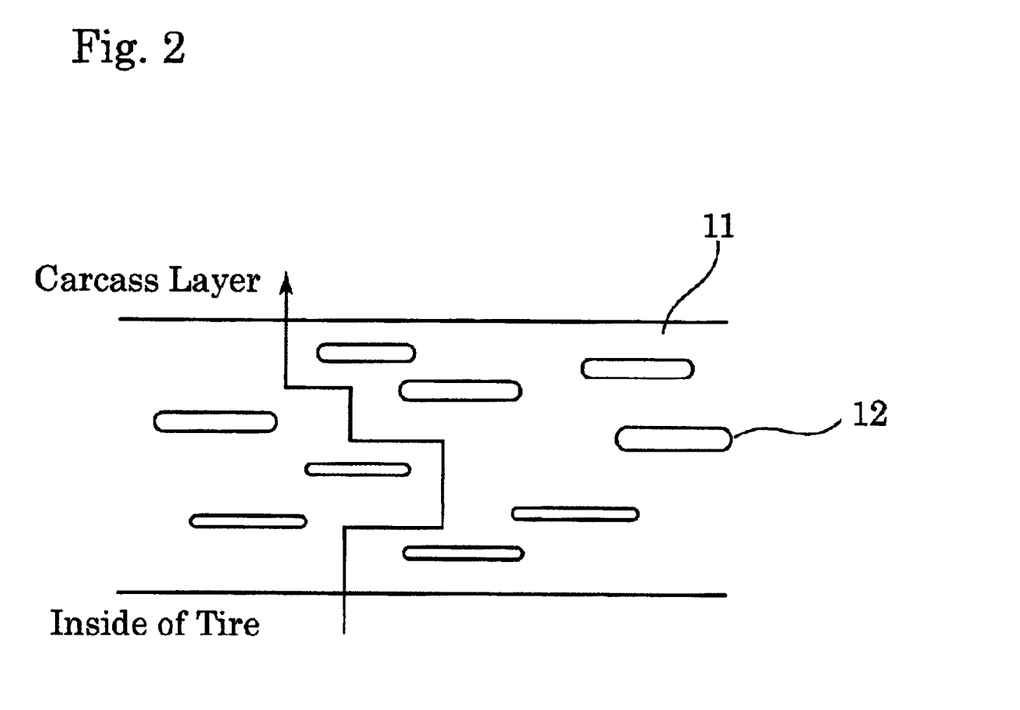
FIG. 2 is a schematic illustration for showing the layered or plate-like minerals contained in the inner liner of the present invention.

FIG. 2 is a partial cross-sectional, schematic view showing a tire having an inner liner made of the rubber composition of the present invention. Particles 12 of the layered or plate-like mineral dispersed in an inner liner layer 11 are orientated so that the surface thereof crosses the thickness direction of the inner liner layer, i.e., the surface thereof is parallel or nearly parallel to the surface of the inner liner layer. The arrow shows the flow pass of air from the inside of tire to a carcass layer when air leakage occurs. As shown in the figure, air entered into the inner liner is prevented from going straight forward by the layered or plate-like mineral and forced to go around the layered or plate-like mineral, thereby taking a long way for passing through the inner liner.

Thus, a low air permeation of the inner liner made of the rubber composition of the present invention can be presumed to be attained by the prevention of air inside a tire from passing through the inner liner because of the orientation of the particles of the layered or plate-like mineral compounded with the rubber composition in the same direction. In contrast, a clay having a large aspect ratio, which has been conventionally compounded into a inner liner rubber, is difficult to be uniformly dispersed into a rubber by the kneading process and forms an agglomerate. The agglomerate acts as a fracture point in a vulcanized rubber composition to reduce the flexural resistance and the low-temperature durability of an inner liner, thereby deteriorating the durability of a tire. By the use of the layered or plate-like mineral having a limited aspect ratio of 3 or more and less than 30, the present invention succeeds to reduce the air permeability of the inner liner without reducing the flexural resistance and the low-temperature durability. In addition, by simultaneously using carbon black as a reinforcing filler while regulating each compounding amount and the total compounding amount within the specific ranges, the effect of the layered or plate-like mineral can be further enhanced.

Figure 3:
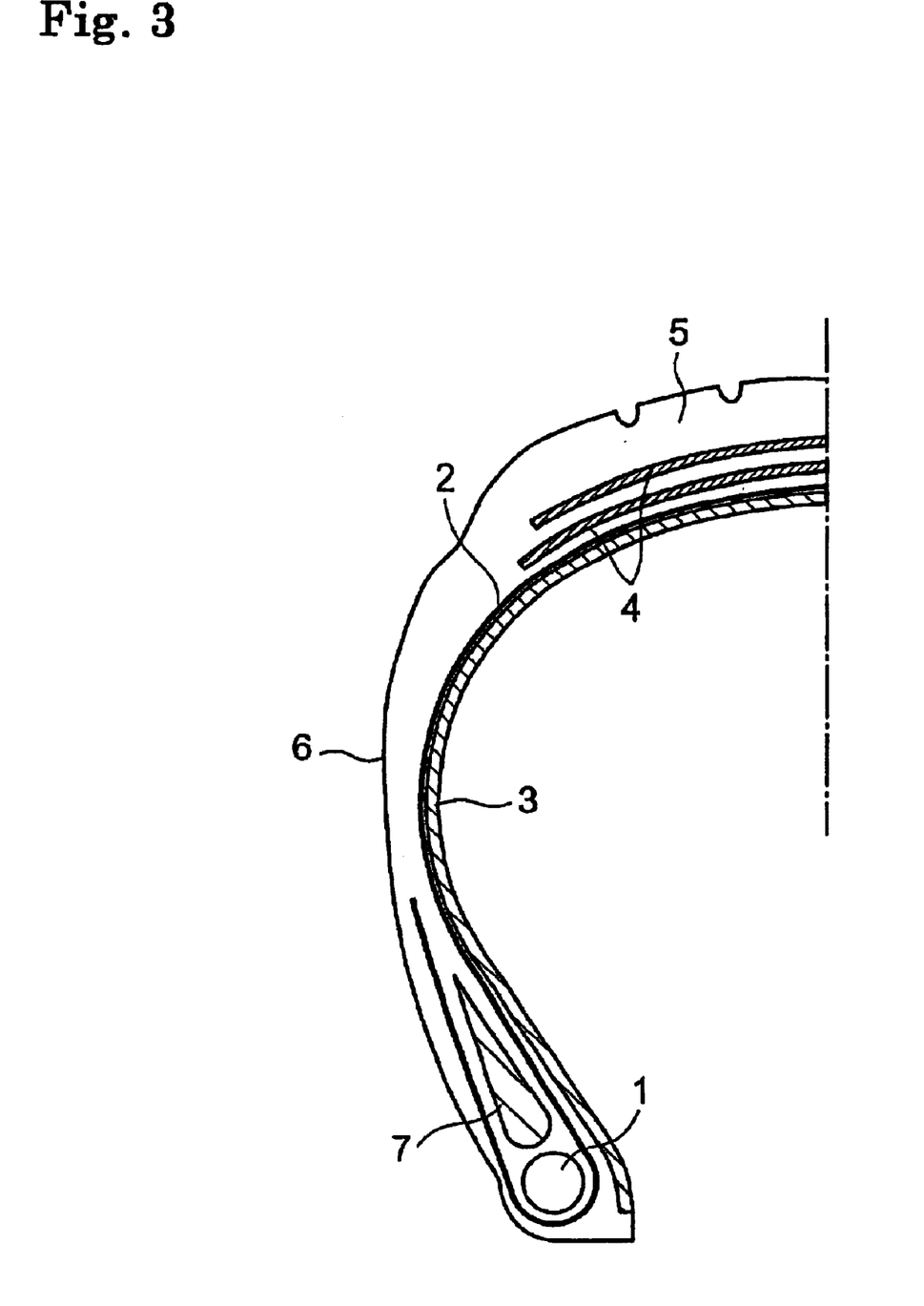
FIG. 3 is a cross-sectional view showing a left half of the pneumatic tire of the present invention.

FIG. 3 is a partial cross-sectional view showing a pneumatic tire of the present invention, in which the tire has a carcass layer 2 comprising a carcass ply which extends around a bead core 1 and has radially extending cords, an inner liner 3 disposed radially inward of the carcass layer, a belt portion comprising two belt plies 4 disposed radially outward of a crown portion of the carcass layer, a tread portion 5 disposed radially outward of the belt portion, and a sidewall portion 6 disposed at right and left lateral sides of the tread portion. The inner liner 3 of the pneumatic tire having the above structure is made of the rubber composition of the present invention. The thickness D of the inner liner 3 may be varied depending on tire size, and generally 0.2 to 2.5 mm. Preferably, 0.2 to 1.2 mm for a tire of passenger vehicle, 0.8 to 2.5 mm for a tire of truck and bus, and 1 to 2 mm for a tire of airplane. The gas for inflating the tire may be air or nitrogen.

The present invention will be described in more detail with reference to the following examples. However, it should be noted that the following examples are merely illustrative and not intended to limit the scope of the present invention thereto.

In Examples 1 to 28 and Comparative Examples 1 to 6, the properties were measured by the following methods.

(1) Air Permeation Resistance of a Vulcanized Rubber Composition

According to the method A (pressure difference method) of JIS K7126-1987 "Test of Gas Permeability of Plastic Film and Sheet", the air permeability constant of each specimen was measured. In Tables 1 to 3, the reciprocal number of the air permeability constant is shown by the index number taking the value of Comparative Examples 1, 3 or 5 as 100. The larger the index number, the better the air permeation resistance.

(2) Flexural Fatigue Resistance of a Vulcanized Rubber Composition

According to de Mattia test of JIS K6260-1999, the number of the repeated flex cycle until the specimen was broken was measured at room temperature under 40 mm stroke. The results are shown in Tables 1 to 3 by the index number taking the result of Comparative Example 1 or 5 as 100. The larger the index number, the better the flexural fatigue resistance.

(3) Low-Temperature Durability of a Vulcanized Rubber Composition

According to the low-temperature impact brittleness test of JIS K6301-1995, the brittle temperature was measured. The results are shown in Table 2 by the index number taking the result of Comparative Example 3 as 100. The larger the index number, the better the low-temperature durability.

(4) Dynamic Storage Modulus (−20° C.) of a Vulcanized Rubber Composition

The dynamic storage modulus of a specimen of 2.0 mm thick, 5.0 mm wide and 20 mm long was measured at −20° C. using a spectrometer manufactured by Toyo Seiki Seisakysho Co., Ltd. under conditions of a static initial load of 150 g, an average strain amplitude of 0.1% and a frequency of 32 Hz. The results are shown in Table 3.

(5) Modulus of Non-Vulcanized Rubber Composition

The tensile stress at 50% elongation $M_{50}$ of a JIS No. 5 specimen (ring specimen) was measured according to JIS K6301-1995 at a tensile speed of 100±5 mm/min. The results are shown in Tables 1 and 2 by the index numbers taking the result of Comparative Example 1 or 3 as 100. The larger the index number, the larger the modulus.

EXAMPLES 1 TO 13 AND COMPARATIVE EXAMPLES 1 AND 2

The compounding ingredients of respective amounts shown in Table 1, 5.0 parts by weight of a spindle oil, 1.0 part by weight of zinc white, 0.5 part by weight of a vulcanization accelerator (Nocceler NS (trade mark) manufactured by Ouchi Shinko Chemical Industrial Co., Ltd.; N-tert-butyl-2-benzothiazyl-sulfenamide), and 1.0 part by weight of sulfur were kneaded in a Banbury mixer by two-stage process of a high-temperature kneading and a low-temperature kneading. The resultant non-vulcanized rubber composition was measured on its modulus. Then, the non-vulcanized rubber composition was vulcanized at 180° C. for 10 min, and the vulcanized rubber composition was evaluated on the air permeation resistance at 60° C. and the flexural fatigue resistance. The results are shown in Table 1.

TABLE 1

|  | Comparative Examples | | Examples | | |
|---|---|---|---|---|---|
|  | 1 | 2 | 1 | 2 | 3 |
| Formulation (part by weight) | | | | | |
| Natural rubber RSS#1 | — | — | 55 | 55 | — |
| 1,2BR*1 | — | — | — | — | — |
| Chlorinated butyl rubber*2 | 100 | 100 | 45 | 45 | 100 |
| Modified butyl rubber*3 | — | — | — | — | — |
| FRR*4 | — | — | — | — | — |
| Nylon 6 short fiber*5 | — | — | — | — | — |
| Carbon black GPF | 55 | 10 | 10 | 20 | 20 |
| Carbon black SAF | — | — | — | — | — |
| Crown clay*6 | — | 200 | — | — | — |
| Flat clay*7 | — | — | 300 | 200 | 150 |
| Coupling agent Si69*8 | — | — | — | — | — |
| Dispersion improver*9 | — | 3 | 5 | 3 | 2 |
| Resorcinol | — | — | — | — | — |
| Hexamethylenetetramine | — | — | — | — | — |
| Results (by index number) | | | | | |
| Air permeation resistance (60° C.) | 100 | 150 | 330 | 300 | 450 |
| Flexural fatigue resistance | 100 | 90 | 90 | 110 | 150 |
| Modulus | 100 | 110 | 190 | 180 | 150 |

|  | Examples | | | | |
|---|---|---|---|---|---|
|  | 4 | 5 | 6 | 7 | 8 |
| Formulation (part by weight) | | | | | |
| Natural rubber RSS#1 | — | — | — | — | — |
| 1,2BR*1 | — | — | — | 20 | — |
| Chlorinated butyl rubber*2 | 100 | 94 | 100 | 80 | 100 |
| Modified butyl rubber*2 | — | — | — | — | — |
| FRR*4 | — | 4.5 | — | — | — |
| Nylon 6 short fiber*5 | — | — | — | — | — |
| Carbon black GPF | 20 | 20 | — | 20 | 10 |
| Carbon black SAF | — | — | 20 | — | — |
| Crown clay*6 | — | — | — | — | — |
| Flat clay*7 | 200 | 150 | 150 | 130 | 100 |
| Coupling agent Si69*8 | — | — | — | 2 | 1 |
| Dispersion improver*9 | 3 | 2 | 2 | — | 1 |
| Resorcinol | — | — | — | — | — |
| Hexamethylenetetramine | — | — | — | — | — |
| Results (by index number) | | | | | |
| Air permeation resistance (60° C.) | 650 | 430 | 450 | 360 | 440 |
| Flexural fatigue resistance | 100 | 135 | 145 | 100 | 140 |
| Modulus | 170 | 220 | 160 | 170 | 190 |

|  | Examples | | | | |
|---|---|---|---|---|---|
|  | 9 | 10 | 11 | 12 | 13 |
| Formulation (part by weight) | | | | | |
| Natural rubber RSS#1 | — | 20 | — | — | — |
| 1,2BR*1 | — | — | — | — | — |
| Chlorinated butyl rubber*2 | 100 | 80 | 100 | 100 | — |
| Modified butyl rubber*3 | — | — | — | — | 86 |
| FRR*4 | — | — | — | — | 21 |
| Nylon 6 short fiber*5 | — | — | — | 3 | — |
| Carbon black GPF | — | 10 | 35 | 20 | 20 |
| Carbon black SAF | — | — | — | — | — |
| Crown clay*6 | — | — | — | — | — |
| Flat clay*7 | 100 | 100 | 150 | 130 | 150 |
| Coupling agent Si69*8 | 1 | — | — | — | — |
| Dispersion improver*9 | 1 | — | 2 | 1 | 2 |
| Resorcinol | — | — | — | 2 | — |
| Hexamethylenetetramine | — | — | — | 1.3 | — |

TABLE 1-continued

Results (by index number)

| | | | | | |
|---|---|---|---|---|---|
| Air permeation resistance (60° C.) | 100 | 150 | 330 | 300 | 450 |
| Flexural fatigue resistance | 100 | 90 | 90 | 110 | 150 |
| Modulus | 100 | 110 | 190 | 180 | 150 |

Note
*[1]Syndiotactic Poly(1,2-butadiene) (manufactured by JSR Corporation; JSR RB810, trade mark)
*[2]Enjay Butyl HT10-66 (trade mark; manufactured by Enjay Chemical Co., Ltd.)
*[3]Halogenated isobutylene-p-methylstyrene copolymer (manufactured by Exxon; EXPRO50, trade mark)
*[4]FRR (manufactured by Ube Industries, Ltd.; HE 0100, trade mark, natural rubber:nylon short fiber = 2:1 (by weight))
*[5]Nylon 6 short fiber (manufactured by Unitika, Ltd.; average diameter = 3.3 dtex, average length = 1 mm)
*[6]Crown clay (manufactured by Shiraishi Calcium Co., Ltd.; Crown Clay-S, trade mark)
*[7]Flat clay (manufactured by J. M. Huber Co., Ltd.; POLYFIL DL, trade mark; aspect ratio = 10) Flat clay is a kaolinic clay with a larger aspect ratio.
*[8]Si69 (trade mark, manufactured by Degussa Aktiengesellschaft)
*[9]Dispersion improver (dimethylstearylamine; manufactured by Kao Corporation, DM80, trade mark)

As compared with a conventional rubber composition for inner liner used in Comparative Example 1, each rubber composition of Examples 1 to 13 was largely improved in its air permeation resistance while retaining, at least, the flexural fatigue resistance, and simultaneously largely increased in the modulus in the non-vulcanized state.

EXAMPLES 14 TO 21 AND COMPARITIVE EXAMPLES 3 AND 4

The compounding ingredients of respective amounts shown in Table 2, 10 parts by weight of a spindle oil, 1.5 parts by weight of zinc white, 0.5 part by weight of a vulcanization accelerator (Nocceler NS (trade mark) manufactured by Ouchi Shinko Chemical Industrial Co., Ltd.; N-tert-butyl-2-benzothiazylsulfenamide), and 1.0 part by weight of sulfur were kneaded in a Burberry mixer by two-stage process of a high-temperature kneading and a low-temperature kneading. The resultant non-vulcanized rubber composition was evaluated on its modulus. Then, the non-vulcanized rubber composition was vulcanized at 180° C. for 10 min, and the resultant vulcanized rubber composition was evaluated on the air permeation resistance at 60° C. and the flexural fatigue resistance. The results are shown in Table 2.

TABLE 2

| | Comparative Examples | | Examples | | |
|---|---|---|---|---|---|
| | 3 | 4 | 14 | 15 | 16 |
| Formulation (part by weight) | | | | | |
| Natural rubber RSS#1 | 50 | 70 | 70 | 80 | 70 |
| 1,2BR*[10] | — | — | — | — | — |
| Brominated butyl rubber*[11] | 50 | 30 | 30 | 20 | 30 |
| Modified butyl rubber*[3] | — | — | — | — | — |
| FRR*[4] | — | — | — | — | — |
| Nylon 6 short fiber*[5] | — | — | — | — | — |
| Carbon black GPF | 55 | 55 | 20 | 20 | 20 |
| Carbon black SAF | — | — | — | — | — |
| Crown clay*[6] | — | — | — | — | — |
| Flat clay*[7] | — | — | 80 | 80 | 100 |
| Coupling agent Si69*[8] | — | — | — | — | — |
| Dispersion improver*[9] | — | — | — | — | 2 |
| Resorcinol | — | — | — | — | — |
| Hexamethylenetetramine | — | — | — | — | — |

TABLE 2-continued

Results (by index number)

| | | | | | |
|---|---|---|---|---|---|
| Air permeation resistance (60° C.) | 100 | 70 | 130 | 105 | 220 |
| Flexural fatigue resistance | 100 | 110 | 110 | 118 | 110 |
| Modulus | 100 | 110 | 110 | 115 | 130 |

| | Examples | | | | |
|---|---|---|---|---|---|
| | 17 | 18 | 19 | 20 | 21 |
| Formulation (part by weight) | | | | | |
| Natural rubber RSS#1 | 70 | 70 | 50 | 70 | 64 |
| 1,2BR*[10] | — | — | 20 | — | — |
| Chlorinated butyl rubber*[2] | 30 | — | 30 | 30 | 30 |
| Modified butyl rubber*[3] | — | 30 | — | — | — |
| FRR*[4] | — | — | — | — | 4.5 |
| Nylon 6 short fiber*[5] | — | — | — | 3 | — |
| Carbon black GPF | — | — | 20 | 20 | 20 |
| Carbon black SAF | 20 | — | — | — | — |
| Crown clay*[6] | — | — | — | — | — |
| Flat clay*[7] | 100 | 200 | 100 | 100 | 100 |
| Coupling agent Si69*[8] | — | — | — | — | — |
| Dispersion improver*[9] | 2 | 3 | 2 | 2 | 2 |
| Resorcinol | — | — | — | 2 | — |
| Hexamethylenetetramine | — | — | — | 1.3 | — |
| Results (by index number) | | | | | |
| Air permeation resistance (60° C.) | 215 | 330 | 230 | 250 | 250 |
| Flexural fatigue resistance | 110 | 110 | 115 | 110 | 110 |
| Modulus | 170 | 270 | 170 | 500 | 480 |

Note
*[10]Syndiotactic poly(1,2-butadiene) (manufactured by JSR Corporation; RB100, trade mark)
*[11]Bromobutyl 2244 (trade mark; manufactured by JSR Corporation)
*[2] to *[9] as defined in Table 1.

The following would appear from the results of Table 2. The air permeation resistance and the low-temperature brittle resistance (low-temperature durability) of the vulcanized rubber composition and the modulus of the non-vulcanized rubber composition are all insufficient when the rubber composition does not contain the layered or plate-like mineral but contains 40 parts by weight or more of the butyl-based rubber as in Comparative Example 3. When the rubber composition does not contain the layered or plate-like mineral but contains 40 parts by weight or less of the butyl-based rubber as in Comparative Example 4, the low-temperature brittle resistance and the modulus of the non-vulcanized rubber composition are relatively good as compared with Comparative Example 3, but the air permeation resistance is poor. In contrast, in the examples of the present invention, the air permeation resistance and the low-temperature brittle resistance of the vulcanized rubber and the modulus of the non-vulcanized rubber are improved and well-balanced.

EXAMPLES 22 TO 28 AND COMPARATIVE EXAMPLES 5 AND 6

The compounding ingredients of respective amounts shown in Table 3, 2.0 parts by weight of zinc white, 1.0 part by weight of a vulcanization accelerator DM (dibenzothiazyldisulfide) and 1.0 part by weight of sulfur were kneaded in a Banbury mixer by two-stage process of a high-temperature kneading and a low-temperature kneading, thereby preparing each non-vulcanized rubber composition.

The non-vulcanized rubber composition was vulcanized at 180° C. for 10 min, and each resultant specimen was evaluated on the air permeation resistance at 60° C., the flexural fatigue resistance and the dynamic storage modulus at −20° C. The results are shown in Table 3.

TABLE 3

|  | Comparative Examples | | Examples | |
|---|---|---|---|---|
|  | 5 | 6 | 22 | 23 |
| Formulation (part by weight) | | | | |
| Natural rubber RSS#1 | — | — | — | — |
| Brominated butyl rubber*11 | 100 | 100 | 100 | 100 |
| Carbon black GPF | 70 | 10 | 10 | 10 |
| Crown clay*6 | — | 60 | — | — |
| Flat clay*7 | — | — | 60 | 100 |
| Dispersion improver*9 | — | — | 1.0 | 1.0 |
| Results | | | | |
| Air permeation resistance (60° C.) (by index number) | 100 | 100 | 300 | 390 |
| Flexural fatigue resistance (by index number) | 100 | 80 | 200 | 155 |
| dynamic storage modulus (−20° C.) (MPa) | 540 | 450 | 460 | 550 |

|  | Examples | | | | |
|---|---|---|---|---|---|
|  | 24 | 25 | 26 | 27 | 28 |
| Formulation (part by weight) | | | | | |
| Natural rubber RSS#1 | — | — | 15 | — | — |
| Brominated butyl rubber*11 | 100 | 100 | 85 | 100 | 100 |
| Carbon black GPF | 10 | 50 | 10 | 10 | 10 |
| Crown clay*6 | — | — | — | — | — |
| Flat clay*7 | 170 | 60 | 60 | 60 | 170 |
| Dispersion improver*9 | 1.0 | 1.0 | 1.0 | — | 3.0 |
| Results | | | | | |
| Air permeation resistance (60° C.) (by index number) | 430 | 380 | 110 | 300 | 430 |
| Flexural fatigue resistance (by index number) | 100 | 160 | 260 | 150 | 330 |
| dynamic storage modulus (−20° C.) (MPa) | 665 | 605 | 160 | 460 | 660 |

Note
*6, *7 and *9 as defined in Table 1.
*11 as defined in Table 2.

As seen from Table 3, Examples 22 to 28 are superior to Comparative Examples with respect to the balance of the air permeation resistance, the flexural fatigue resistance and the dynamic storage modulus of the vulcanized rubber compositions.

In the following Examples 29 to 43 and Comparative Examples 7 to 13 the properties were measured by the following methods.

(1) Air Permeation Resistance of a Vulcanized Rubber Composition

According to the method A of JIS K7126-1987, the air permeability was measured using an air permeability machine. The results are shown in Tables 4 to 6 by index numbers taking the air permeability of Comparative Example 7, 10 or 12 as 100. The smaller the index number, the lower the air permeability.

(2) Flexural Fatigue Resistance of a Vulcanized Rubber Composition

According to the flex test method of JIS K6260-1999, each test piece of vulcanized rubber was prepared, which was subjected to flex test to measure the time required until a crack of 10 mm long occurred on the test piece. The results are shown in Tables 4 to 6 by index numbers taking the measured time of Comparative Example 7, 10 or 12 as 100. The larger the index number, the better the flexural fatigue resistance.

(3) Low-Temperature Durability of a Vulcanized Rubber Composition

According to the low-temperature impact brittleness test of JIS K6301-1995, each test piece was prepared and subjected to the low-temperature impact brittleness test to measure the impact brittle temperature. The difference (° C.) between the measured impact brittle temperature and that of Comparative Example 10 or 12 is shown in Tables 5 and 6. The smaller the difference, the better the low-temperature durability.

(4) Strength of a Non-Vulcanized Rubber Composition

A non-vulcanized rubber composition was sufficiently warmed by 8-inch rolls to prepare a sheet of 4 mm thick, which was then cut into a test piece by a JIS No. 5 cutting die. The test piece was subjected to a strength test according to JIS K6251-1993 to measure the breaking strength. The results are shown in Table 4 by the index numbers taking the breaking strength of Comparative Example 7 as 100. The larger the index number, the higher the strength of the non-vulcanized rubber composition.

(5) Agglomerate Content of Non-Vulcanized Rubber Composition

The particle size distribution of particles having a maximum particle size of 20 μm or less was measured using Dispergrader 1000 (manufactured by Optigrade Co., Ltd.). By comparing the photographic image of each test piece and a reference photograph, the results were ranked taking the result of Comparative Example 12 as 100 (Table 6). The agglomerate content expresses the degree of dispersion of fillers. The larger the rank, the better the dispersion.

EXAMPLES 29 TO 31 AND COMPARATIVE EXAMPLES 7 TO 9

The compounding ingredients of respective amounts shown in Table 4, 10 parts by weight of a process oil, 3.0 parts by weight of zinc white, 2.0 parts by weight of stearic acid, and 1.0 part by weight of sulfur were kneaded in a Banbury mixer by two-stage process of a high-temperature kneading and a low-temperature kneading. The resultant non-vulcanized rubber composition was evaluated on its strength. Then, the non-vulcanized rubber composition was vulcanized at 145° C. for 45 min, and each test piece of the resultant vulcanized rubber composition was evaluated on the air permeation resistance and the flexural fatigue resistance. The results are shown in Table 4.

TABLE 4

|  | Comparative Examples | | |
|---|---|---|---|
|  | 7 | 8 | 9 |
| Formulation (part by weight) | | | |
| Natural rubber RSS#1 | — | — | 15 |
| Brominated butyl rubber*11 | 100 | 100 | 85 |
| Carbon black A*12 | 50 | — | 50 |
| Carbon black B*13 | — | 80 | — |
| Clay*14 | — | — | — |
| Results | | | |
| Air permeation resistance (by index number) | 100 | 85 | 150 |
| Flexural fatigue resistance (by index number) | 100 | 100 | 120 |
| Strength of non-vulcanized rubber (by index number) | 100 | 80 | 150 |

TABLE 4-continued

|  | Comparative Examples | | | |
| --- | --- | --- | --- | --- |
|  | 29 | 30 | 31 | 32 |
| Formulation (part by weight) | | | | |
| Natural rubber RSS#1 | — | — | 15 | — |
| Brominated butyl rubber*11 | 100 | 100 | 85 | 100 |
| Carbon black A*12 | 30 | 20 | 20 | 50 |
| Carbon black B*13 | — | — | — | — |
| Clay*14 | 40 | 80 | 80 | 30 |
| Results | | | | |
| Air permeation resistance (by index number) | 67 | 50 | 85 | 66 |
| Flexural fatigue resistance (by index number) | 390 | 280 | 400 | 125 |
| Strength of non-vulcanized rubber (by index number) | 100 | 105 | 180 | 130 |

Note
*12Carbon black A: DBP 85 m/L/100 g, IA 35 mg/g.
*13Carbon black B: DBP 45 mL/100 g, IA 16 mg/g.
*14Clay: kaolinic clay having an aspect ratio of 12.5.
*11 as defined in Table 2

The results of Table 4 show that the rubber compositions of the present invention are excellent in the air permeation resistance and flexural fatigue resistance after vulcanization, and excellent in the strength and workability before vulcanization.

EXAMPLES 33 TO 36 AND COMPARATIVE EXAMPLE 10 AND 11

The compounding ingredients shown in Table 5 were kneaded in a Banbury mixer by two-stage process of a high-temperature kneading and a low-temperature kneading, thereby preparing each non-vulcanized rubber composition for an inner liner. The non-vulcanized rubber composition was vulcanized at 145° C. for 45 min, and each test piece of the resultant vulcanized rubber component was evaluated on the air permeation resistance, the flexural fatigue resistance and the low-temperature durability. The results are shown in Table 5.

TABLE 5

|  | Comparative Examples | |
| --- | --- | --- |
|  | 10 | 11 |
| Formulation (part by weight) | | |
| Brominated butyl rubber*11 | 100 | 100 |
| Carbon black*15 | 60 | 50 |
| Clay (aspect ratio 12.5)*16 | — | — |
| Clay (aspect ratio 38.0)*17 | — | 30 |
| Process oil | 10 | 10 |
| Zinc white | 3 | 3 |
| Stearic acid | 2 | 2 |
| Sulfur | 1 | 1 |
| Results | | |
| Air permeation resistance (by index number) | 100 | 69 |
| Flexural fatigue resistance (by index number) | 100 | 80 |
| Low-temperature durability (temperature difference) | 0 | 0 |

TABLE 5-continued

|  | Examples | | | |
| --- | --- | --- | --- | --- |
|  | 33 | 34 | 35 | 36 |
| Formulation (part by weight) | | | | |
| Brominated butyl rubber*11 | 100 | 100 | 100 | 100 |
| Carbon black*15 | 50 | 40 | 30 | 40 |
| Clay (aspect ratio: 12.5)*16 | 30 | 20 | 40 | 30 |
| Clay (aspect ratio: 38.0)*17 | — | — | — | — |
| Process oil | 10 | 10 | 10 | 10 |
| Zinc white | 3 | 3 | 3 | 3 |
| Stearic acid | 2 | 2 | 2 | 2 |
| Sulfur | 1 | 1 | 1 | 1 |
| Results | | | | |
| Air permeation resistance (by index number) | 66 | 81 | 59 | 70 |
| Flexural fatigue resistance (by index nuber) | 125 | 355 | 390 | 255 |
| Low-temperature durability (temperature difference) | −0.5 | −2.5 | −1 | −1 |

Note
*15N660 (manufactured by Cabot Corporation)
*16Polyfil DL (trade mark, nanufactured by J.M. Huber Corporation)
*17Clay having a high aspect ratio prepared by sieving commercially available clay.

As seen from Table 5, the rubber compositions for an inner liner of the present invention are excellent in the air permeation resistance, flexural fatigue resistance and low-temperature durability after vulcanization.

EXAMPLES 37 TO 43 AND COMPARATIVE EXAMPLES 12 AND 13

A rubber component (100 parts by weight) shown in Table 6, a filler or fillers of respective amount(s) shown in Table 6, 10 parts by weight of a process oil (spindle No. 2 manufactured by Japan Oil Co., Ltd.; ko-grade blown asphalt manufactured by Japan Oil Co., Ltd.), 3 parts by weight of zinc white, 1 part by weight of a vulcanization accelerator (Nocceler DM-P, trade mark, manufactured by Ouchi Shinko Chemical Industrial Co., Ltd.), and 1 part by weight of sulfur were compounded in the following manner to prepare a non-vulcanized rubber composition.

The rubber component shown in Table 6 was masticated in a Banbury mixer for a period of time shown in Table 6 (step (a)). Then, after adding the filler or fillers and the other compounding ingredients shown in Table 6, the kneading was carried out by single stage for a period of time shown in Table 6 while controlling the kneading so as to reach the temperature (dump temperature) shown in Table 6 at the end of kneading (step (b)). With such a kneading method, the electric power consumption was reduced much more as compared with the preparation of a rubber composition of the same compounding formulation by two-stage kneading at a high temperature and a low temperature.

The non-vulcanized rubber composition was evaluated on its agglomerate content. Then, the non-vulcanized rubber composition was vulcanized at 145° C. for 45 min, and the test piece of each vulcanized rubber composition was evaluated on the air permeation resistance, flexural fatigue resistance and low-temperature durability. The results are shown in Table 6.

TABLE 6

|  | Comparative Examples | | Examples | | |
| --- | --- | --- | --- | --- | --- |
|  | 12 | 13 | 37 | 38 | 39 |
| Rubber component (part by weight) | | | | | |
| Natural rubber RSS#1 | 10 | 10 | 10 | 30 | 10 |
| Brominated butyl rubber*[11] | 90 | 90 | 90 | 70 | 90 |
| Filler (part by weight) | | | | | |
| Carbon black*[18] | 60 | 50 | 50 | 30 | 40 |
| Crown clay*[6] | — | 20 | — | — | — |
| Clay II*[20] (aspect ratio: 15) | — | — | — | 40 | 30 |
| Clay III*[21] (aspect ratio: 40) | — | — | 20 | — | — |
| Step (a) | | | | | |
| Pre-kneading time (sec) | 20 | 20 | 20 | 20 | 20 |
| Step (b) | | | | | |
| Kneading time (sec) | 180 | 180 | 180 | 180 | 200 |
| Dump temperature (° C.)*[22] | 120 | 120 | 120 | 115 | 120 |
| Properties of rubber composition | | | | | |
| Agglomerate content (rank) | 100 | 90 | 90 | 155 | 140 |
| Air permeation resistance (by index number) | 100 | 95 | 89 | 59 | 70 |
| Flexural fatigue resistance (by index number) | 100 | 90 | 70 | 370 | 240 |
| Low-temperature durability (by index number) | 0 | 0.8 | 2 | −1 | −0.5 |

|  | Examples | | | |
| --- | --- | --- | --- | --- |
|  | 40 | 41 | 42 | 43 |
| Rubber component (part by weight) | | | | |
| Natural rubber RSS#1 | — | 20 | 20 | 20 |
| Brominated butyl rubber*[11] | 100 | 80 | 80 | 80 |
| Filler (part by weight) | | | | |
| Carbon black*[18] | 40 | 35 | 40 | 60 |
| Crown clay*[6] | — | — | — | — |
| Clay II*[20] (aspect ratio: 15) | 30 | 35 | 70 | 10 |
| Clay III*[21] (aspect ratio: 40) | — | — | — | — |
| Step (a) | | | | |
| Pre-kneading time (sec) | 10 | 30 | 50 | 60 |
| Step (b) | | | | |
| Kneading time (sec) | 240 | 180 | 180 | 180 |
| Dump temperature (° C.)*[22] | 126 | 110 | 115 | 130 |
| Properties of rubber composition | | | | |
| Agglomerate content (rank) | 163 | 135 | 159 | 128 |
| Air permeation resistance (by index number) | 68 | 72 | 76 | 80 |
| Flexural fatigue resistance (by index number) | 200 | 270 | 140 | 240 |
| Low-temperature durability (by index number) | −0.5 | −0.5 | −0.5 | −0.5 |

Note
*[8]Carbon black: N660 (manufactured by Cabot Co., Ltd.)
*[19]Clay I (crown clay having an aspect ratio of 3)
*[20]Clay II (kaolinic clay having an aspect ratio of 15)
*[21]Clay III (kaolinite soft clay having an aspect ratio of 40)
*[22]Dump temperature (temperature of rubber composition being taken out of a Banbury mixer after kneading)
*[11] as defined in Table 2.

As seen from Table 6, the rubber compositions of Examples 37 to 43 are good in the dispersion of the filler and excellent in the air permeation resistance, flexural fatigue resistance and low-temperature durability as compared with the rubber compositions of Comparative Examples.

Industrial Applicability

As described above in detail, the rubber composition for an inner liner of the present invention is remarkably improved in the air permeation resistance and also improved in the workability as compared with conventional rubber compositions compounded with a butyl rubber. Therefore, the rapture and hole defect of a non-vulcanized sheet during the tire construction can be avoided. By using the rubber composition, the gauge of an inner liner for a pneumatic tire can be reduced while maintaining the inner pressure of tire, thereby reducing the weight of tire. In addition, the production process of the present invention provides a rubber composition compounded with the layered or plate-like mineral in good productivity without detracting the properties.

What is claimed is:

1. A pneumatic tire, comprising an inner liner made of a rubber composition comprising 100 parts by weight of a rubber component comprising at least one butyl-based rubber, 10 to 50 parts by weight of a layered or plate clay having an aspect ratio of from 3 to less than 30, and 10 to 60 parts by weight of a GPF carbon black, wherein the rubber composition does not comprise a dispersion improver, and the layered or plate clay is oriented so that its surface crosses a thickness direction of the inner liner.

2. The pneumatic tire according to claim 1, wherein the butyl-based rubber comprises a halogenated rubber.

3. The pneumatic tire according to claim 1, wherein the layered or plate clay comprises a kaolinic clay or a sericitic clay.

4. The pneumatic tire according to claim 1, wherein a total compounding amount of the clay and the carbon black is 50 parts by weight or more.

5. The pneumatic tire according to claim 1, wherein the carbon black has an iodine adsorption of 40 mg/g or less and a dibutyl phthalate adsorption of 100 ml/100 g or less.

6. The pneumatic tire according to claim 1, wherein 0.3 to 5 parts by weight of an organic short fiber is further compounded per 100 parts by weight of the rubber component.

7. The pneumatic tire according to claim 6, wherein the organic short fiber is polyamide fiber.

8. A pneumatic tire, comprising an inner liner made of a rubber composition comprising 100 parts by weight of a rubber component comprising at least one butyl-based rubber, 10 to 50 parts by weight of a layered or plate clay having an aspect ratio of from 3 to less than 30, and 10 to 60 parts by weight of a GPF carbon black, wherein the layered or plate clay is oriented so that its surface crosses a thickness direction of the inner liner, and 0.1 to 5 parts by weight of a dispersion improver is further compounded per 100 parts by weight of the rubber component.

9. The pneumatic tire according to claim 1 or 8, wherein a dynamic elastic modulus of the rubber composition after vulcanization is 800 MPa or less at −20° C. under a strain amplitude of 0.1% or less.

10. A process for producing the pneumatic tire of claim 1, which comprises a step (a) of masticating the rubber component and a step (b) of kneading the masticated rubber component with the layered or plate clay and the other compounding ingredients, wherein the rubber component is masticated in a kneading machine in a pre-kneading step, and then a kneading treatment is carried out by single stage after adding the layered or plate clay and the other compounding ingredients, and the layered or plate clay and the GPF carbon black are compounded in an amount of 100 parts by weight or less in total.

11. The process according to claim 10, wherein the rubber component is masticated for 10 sec or more in the pre-kneading step, and then the kneading treatment is carried out for one to four minutes while controlling a temperature of the rubber composition to 130° C. or lower at the end of the kneading treatment.

* * * * *